3,671,262
DECAFFEINATION PROCESS

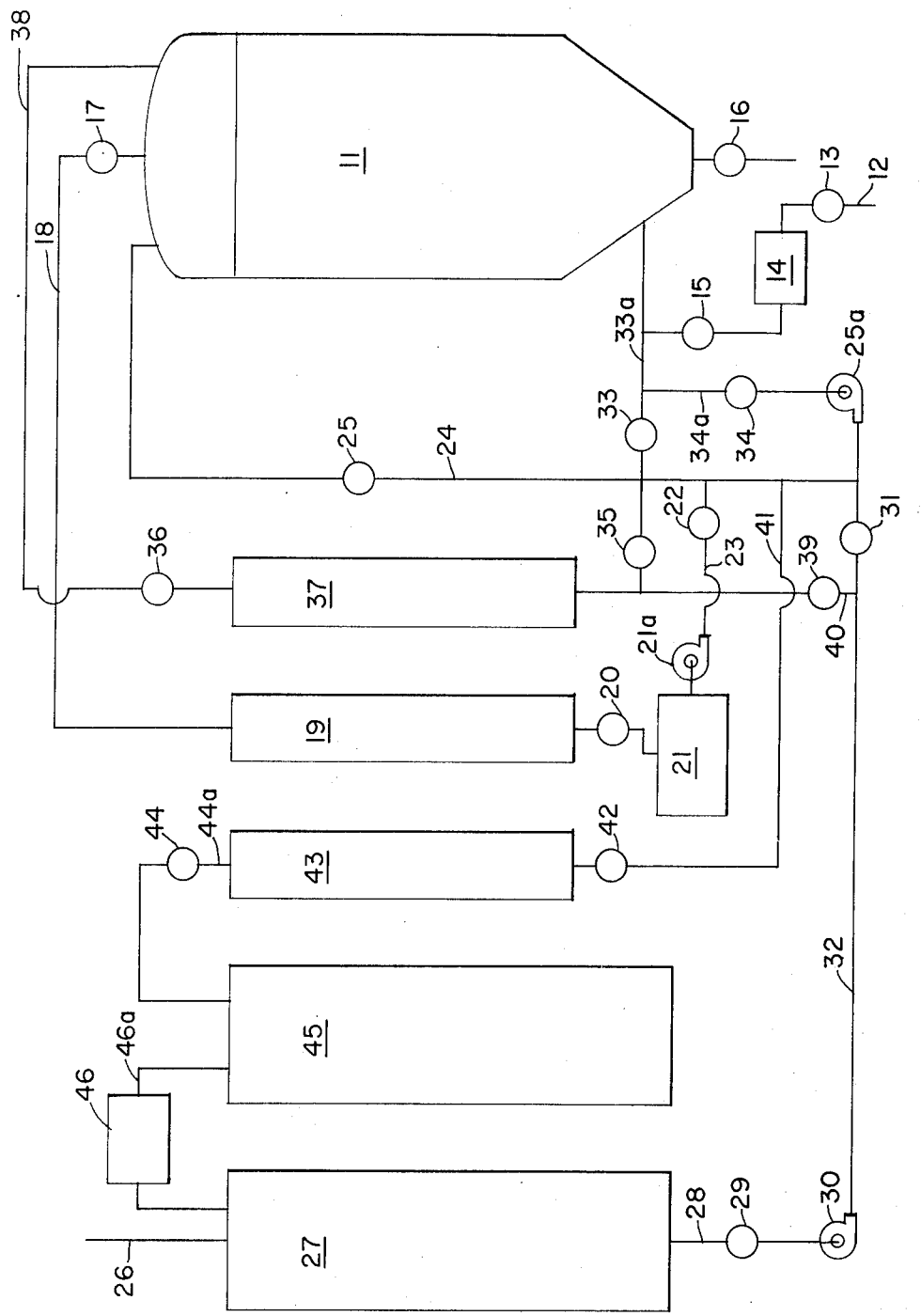

Alan B. Wolfson, Springfield Township, Hamilton County, Jayantilal M. Patel, Reading, and Benjamin Lawrence, Springfield Township, Hamilton County, Ohio, assignors to The Procter & Gamble Company, Cincinnati, Ohio
Continuation of application Ser. No. 23,653, Mar. 30, 1970. This application Feb. 23, 1971, Ser. No. 118,183
Int. Cl. A23f 1/10
U.S. Cl. 99—70         6 Claims

ABSTRACT OF THE DISCLOSURE

Decaffeination total process times and caffeine extraction times are substantially reduced by utilizing a high caffeine solvent velocity and a high exchange rate of solvent with respect to green coffee beans.

CROSS REFERENCE

This application is a continuation of earlier-filed co-pending application, Ser. No. 23,653, filed Mar. 30, 1970 and now abandoned.

BACKGROUND OF THE INVENTION

In recent years the consumer market for decaffeinated coffees has substantially increased. Accordingly, a few commercial manufacturers in the United States are now selling decaffeinated coffee products. One of the major problems involved in preparing a decaffeinated coffee is the rather lengthy process times involved. For example, a typical decaffeination process beginning with green beans and resulting in decaffeinated green beans can and often does take from 31 to 43 hours and from 24 to 36 hours of this total process time is for the caffeine extracting step. Because of the lengthy process times involved, decaffeinated products are often substantially higher in cost than non-decaffeinated products.

Decaffeination using green coffee beans as a starting material and providing decaffeinated green coffee beans as the end product, typically involves five basic steps. These steps are steaming, pre-wetting, caffeine extracting, solvent stripping and finally drying and cooling. These five basic steps are nearly as old as decaffeination itself, and according to Sivetz, Coffee Processing Technology, 1963 ed., Avi Publishing Company, vol. 2, page 207, these five steps have been practiced and well known since at least 1908. For literature disclosing these five basic process steps, see Sivetz, Coffee Processing Technology, vol. 2, page 207, U.S. Pat. 897,840, U.S. Pat. 936,392, U.S. Pat. 1,502,222, U.S. Pat. 1,957,358, and U.S. Pat. 1,977,416.

While disclosures relating to each of these basic steps can be found in the above-cited patents, in order to create the proper setting for applicants' invention, a brief description of each of these steps will be given herein.

Steaming.—In the steaming step, dry green coffee beans are steamed until the moisture contents of the beans is increased to within the range of from 16% to about 21%. Steaming times typically range from 1 to about 5 hours. During the steaming operation the cellular structure of the green coffee beans is softened and opened so that caffeine extraction can be more easily accomplished in subsequent steps. For further details relating to the basic steaming operation, see the above-cited Sivetz reference.

Pre-wetting.—During the pre-wetting step, water is added to the previously steamed green beans to increase the total moisture content to within the range of 30% to 40% by weight. The basic purpose of the pre-wetting procedure is to aid in the subsequent extraction of caffeine. For a detailed discussion of pre-wetting conditions, see Berry, U.S. Pat. 2,284,033. Patel et al., a concurrently filed, co-pending commonly assigned application, Ser. No. 118,182 entitled "An Improved Decaffeination Process," relates to using higher pre-wetting moistures to substantially reduce extraction times.

Caffeine extracting.—During extracting, a chlorinated hydrocarbon solvent capable of extracting caffeine is contacted with the previously steamed and pre-wet green coffee beans. Typical chlorinated hydrocarbon solvents often employed are methylene chloride and trichloroethylene. Typically, the solvent and the beans are allowed to maintain contact at a temperature at or near the boiling point of the solvent for a time of from 24 to 36 hours. Of course, during this operation, spent solvent can continuously be replaced with fresh solvent. Alternatively, the same solvent can be utilized for the entire extraction operation. Extracting is continued until qualitative tests on spent solvent show the amount of caffeine contained in the solvent to be at the desired minimum level. For further details relating to solvent extraction of green coffee beans, see Weimer, U.S. Pat. 1,502,222 and Wilder, U.S. Pat. 1,977,416.

Solvent stripping.—Solvent stripping is usually accomplished by steam-stripping residual solvent from the decaffeinated green coffee beans which have previously been in contact with the caffeine-extracting solvent. Typically, steam is introduced into the extracting vessel at temperatures of from 212° F. to 240° F. and is continually passed over and through the previously extracted green beans until residual solvent can no longer be detected on the beans. Steam stripping can be conducted for from one up to twenty hours, but more typically is within the range of from one to eight hours. For details relating to the general process of steam stripping, see the above-cited references, and especially the Wilder reference.

Drying and cooling.—Subsequent to steam stripping, the beans are usually dried under vacuum at slightly elevated temperatures for a period of time ranging from four to ten hours. Thereafter the beans are cooled to room temperature and are then ready for subsequent roasting and conversion into a decaffeinated coffee product. For further details in relation to the drying step see Lawrence et al., a co-pending, commonly assigned concurrently filed application, Ser. No. 118,185 entitled "Non-Vacuum Drying of Decaffeinated Green Coffee Beans."

The process of this invention relates to the extracting step.

SUMMARY OF THE INVENTION

This invention relates to an improved decaffeination procedure wherein green coffee beans are utilized as a starting material and the end product is decaffeinated green coffee beans. More specifically, the invention relates to an improvement in a decaffeinating process wherein said process involves the steps of steaming green beans, pre-wetting the previously steamed coffee beans, caffeine extracting the previously steamed and pre-wet green coffee beans, solvent stripping residual solvent away from the green coffee beans, and drying and cooling the beans to provide decaffeinated green coffee beans, said process improvement relating to the caffeine extracting step and comprising: utilizing a solvent superficial velocity past the green coffee beans of from .15 ft./min. to 1 ft./min., and preferably from .18 ft./min. to .25 ft./min., and utilizing a solvent exchange rate of from 2 pounds of solvent/pound of coffee/hour, to 12 pounds of solvent/pound of coffee/hour, and preferably from 4 pounds of solvent/pound of coffee/hour to 8 pounds of solvent/pound of coffee/hour. As a result of the process of this invention, caffeine extracting times are reduced from about 10% to as much as about 50%.

BRIEF DESCRIPTION OF THE DRAWING

The figure is a flow chart showing one apparatus for practicing the process of this invention.

DETAILED DESCRIPTION OF THE INVENTION

Before describing in detail applicants' process improvements which relate specifically to the caffeine extracting step, a brief description of an overall decaffeination process utilizing the flow chart of the drawing will be given herein. In the following description, unless specified to the contrary, all valves not specifically mentioned as open are closed.

Green coffee beans are charged into extractor 11 through an inlet opening not specifically shown on the drawing. Steam at a temperature of from 212° F. to 240° F. is introduced into the system through steam line 12 and passes through open valve 13 through separator 14 wherein condensate is trapped, and dry steam passes therethrough and continues on through open valve 15 into line 33a and thereafter into the bottom of extractor 11. Steam is then passed in an upwards manner through the green coffee beans contained in extractor 11, and passes outward through open valve 17 and into line 18 leading to condenser 19 wherein the steam is condensed. The condensate passes through open valve 20 into separator 21 wherein it is collected and saved for subsequent use in the pre-wetting step, as hereinafter explained. During the steaming step, valve 16 remains partially open so that condensate forming on the beans and dropping to the bottom of the extractor 11 can be removed, and saved for use in pre-wetting, if desired.

Preferred steaming temperatures are from 220° F. to 230° F. and it is preferred that steaming continue until the total moisture content of the beans ranges from 16% to 18% and preferably 17%. Typically, it has been found that the moisture content of the beans is about 17% after steaming for from 15 minutes to one hour, and usually about 30 minutes. This completes the steaming step.

After the above-described steaming procedure, the cellular structure of the green coffee beans is softened and opened so that the caffeine contained in the beans can be more easily extracted during the hereinafter described extracting procedure.

Turning now to the pre-wetting step, wherein water is added to the previously steamed green beans to increase the moisture content to within the broad range of from 30% to 40% and to within the preferred range of from 32% to 38%.

The moisture addition of the pre-wetting step can be accomplished many different ways. With reference to the drawing, pre-wetting water from separator 21 can be added to the top of extractor 11 through centrifugal pump 21a, line 23, open valve 22, line 24 and open valve 25. Or, pre-wetting water may be added to the bottom of extractor 11 through open valve 33 and line 33a.

The amount of pre-wet water required to raise the moisture content of the beans in extractor 11 to the desired level is not sufficient to fill extractor 11, and since the next step in the decaffeination process is to extract with a solvent, all or part of the pre-wetting water may be added at the same time as the solvent. Fresh solvent, which has previously been placed in the fresh solvent storage tank 27 through fresh solvent line 26, drains into line 28, through open valve 29 and is pumped by centrifugal pump 30 through line 32 and open valve 31 into line 24 at the same time pre-wetting water is being pumped into line 24 as described above. The two liquids than pass together into extractor 11 either through line 24 and open valve 25 or through open valve 33 and line 33a or, if desired, simultaneously through both. In summary, there are many options for adding pre-wetting water; it can be added either at the top or bottom of extractor 11, or simultaneously at both top and bottom, and either separately from, together with, or partly separate and partly together with the fresh solvent. During the solvent addition operation valve 17 on line 18 remains open in order to vent air and solvent vapors which may form. Generally, however, the solvent and water, assuming they are added simultaneously through the bottom of extractor 11, are added at ambient conditions. It is preferred that sufficient solvent be added to provide a minimum solvent to bean weight ratio of 3:1, and preferably a ratio within the range of from 3:1 to 8:1, and most preferably a ratio of from 3:1 to 5:1.

After the addition of the solvent and the pre-wetting water as previously described, the pre-wetting step is completed and the caffeine extracting procedure is ready to be accomplished. Caffeine extracting is accomplished utilizing heated solvent at temperatures at or near the solvent boiling point, which for methylene chloride is about 105° F. at atmospheric pressure, and continuously circulating solvent in the manner hereinafter described to provide the maximum contact between solvent and beans. For a detailed description of an invention relating to increased solvent temperatures substantially higher than the solvent boiling point to provide substantially reduced extracting times, see Patel et al., a co-pending commonly assigned concurrently filed herewith application, which has previously been cited in connection with the utilization of substantially increased pre-wetting moisture ranges. Prior to any solvent circulation through the entire system, the solvent contained in extractor 11 is heated by continuously circulating through heat exchanger 37 into extractor 11 as follows: Valve 34 is opened and extracting solvent contained in extractor 11 drains into line 33a and line 34a and into pump 25a wherein it is pumped into line 24 and through open valve 35 into heat exchanger 37 wherein the extracting solvent is heated to temperatures as above specified, and then passes through open valve 36 on line 38 and passes back into the top of extractor 11. The circulatory pumping of extracting solvent through heat exchanger 37 and into line 38 and into the top of extractor 11 and out of the bottom of extractor 11 and back into heat exchanger 37 is continued until the extracting solvent has reached the desired extracting temperature. Usually it is preferred that heating be conducted for from 15 minutes to one hour, and preferably, for from 20 minutes to 40 minutes. After circulatory pumping and heating for times within the preferred time ranges, it has been found that the solvent has usually been increased to the required caffeine extracting temperature. After heating, the solvent is ready to begin continuous circulation for the required caffeine extracting time which usually ranges from 24 to 36 hours. During the extracting time fresh solvent is continuously fed into extractor 11 and spent solvent is continuously bled off from extractor 11 while simultaneously a recirculation of solvent is conducted. More specifically, with reference to the drawing, fresh solvent from solvent tank 27 passes into line 28 through open valve 29 and is pumped by pump 30 into line 32, and because valve 31 is closed, passes into line 40 and through open valve 39 on line 40 into heat exchanger 37, wherein the temperature is raised to the required extracting temperature. Thereafter the solvent passes into line 38 through open valve 36 and back down into the top of extractor 11.

Simultaneously with the fresh input of solvent through line 38, spent solvent is removed from the bottom of extractor 11 through open valve 34 and passes through pump 25a into line 24, and because valve 25 on line 24a is partially closed, a portion of the solvent passes into line 41 through open valve 42 and into heat exchanger 43 wherein it is cooled and passes on into line 44a through open valve 44 and into spent solvent storage tank 45. Spent solvent storage tank 45 can be a distilling apparatus, in which case the spent solvent can continuously be distilled and passed into line 46a and through condenser 46 and back into fresh solvent tank 27. As previously mentioned, when withdrawing spent solvent from the bottom of extractor 11 through open valve 34, through pump 25a and into line 24, a portion of the spent solvent passes into line 41; however, because valve 25 on line 24 is only partially closed, a portion of the solvent is recirculated through line 24 back into the top of extractor 11. Recirculation, as just explained, controls the solvent superficial velocity. The solvent exchange rate is controlled by controlling the rate of fresh solvent input and the rate of spent solvent withdrawal. The solvent superficial velocity and the exchange rate will be discussed hereinafter in detail because they form the critical part of applicants' invention.

During the extracting procedure no criticality exists with respect to the pressure employed within the system when temperatures at or near the solvent boiling point are utilized. Of course, as temperatures are increased above the extracting solvent boiling point, increased pressure must be used to keep the solvent from vaporizing. For further details in regard to pressures see the previously cited co-pending Patel et al. application relating to the use of high caffeine extracting temperatures.

After caffeine extracting for the required period of time, solvent is drained from extractor 11 and the now extracted green coffee beans are ready for stripping of residual solvent and subsequent drying and cooling.

Solvent stripping is conducted while the beans are still in extractor 11 and is conducted in the same manner as the steaming operation previously described with reference to the first step in the five basic steps of decaffeination. Solvent stripping is continued by steaming in the manner previously described for from one to eight hours, and preferably, one to two hours.

After solvent stripping by steaming, the beans are discharged from extractor 11 through a discharge line (not depicted in the drawing), and are subsequently dried and cooled and ready for use in preparing a decaffeinated coffee product. Just prior to drying, the moisture content of the beans ranges from about 45% to about 55%. Conventionally, the beans are dried by a method such as vacuum drying at temperatures of from 120° to 240° F. for a period of time ranging from 4 to 10 hours. When vacuum drying is employed, a typical vacuum pressure is from 20 to 27 inches of mercury. Subsequently the beans are usually cooled by convection methods and the decaffeinated green beans are then ready for subsequent roasting and conversion into a decaffeinated coffee product.

Roasting and grinding to provide a roast and ground decaffeinated coffee product can be done in conventional manners such as those described in Sivetz, Vol. I, Chapter 8. Alternatively, the roast and ground coffee can be utilized to prepare an instant coffee product by preparing an extract therefrom and subsequently drying the extract in manners taught in Sivetz, Vol. I, Chapters 9, 10, and 13.

Turning now to the extracting step wherein as previously mentioned applicants' invention is practiced.

Again, as previously mentioned, typical caffeine extracting times when utilizing a method such as that described herein, generally range from 24 to 36 hours. It has been surprisingly and unexpectedly discovered that when the solvent superficial velocity is carefully controlled to within the range of from .15 ft./min. to 1 ft./min., and within the preferred range of .18 ft./min. to .25 ft./min., coupled with a solvent exchange rate of from 2 lbs. of solvent/lb. of coffee/hour to 12 lbs. of solvent/lb. of coffee/hour, and preferably an exchange rate of from 4 pounds of solvent/pound of coffee/hour to 8 pounds of solvent/pound of coffee/hour, that caffeine extracting times can be reduced by from 10% to 50%. Thus, the critical combination and coaction between utilizing applicants' solvent superficial velocity coupled with applicants' solvent exchange rate, allows decreasing caffeine extracting time from, for example, 24 hours down to 16 hours, assuming the use of methylene chloride solvent, a temperature of 105° F., and a pre-wet moisture of 37%.

As used herein, the term "solvent superficial velocity" can be mathematically defined as $$\frac{\text{feet}^3 \text{ of solvent/minute}}{\text{feet}^2 \text{ of extractor}}$$

This fraction reduces to feet of solvent/minute and is a measure of the actual velocity of the solvent past the beans contained in extractor 11.

As previously mentioned, the solvent superficial velocity is controlled, with respect to the flow diagram shown in the drawing, by partially opening valve 25 on line 24 to allow a portion of the used solvent to recirculate back into the top of extractor 11. In actual operation, it has been found convenient to place a flow meter on line 24 so that the exact opening of valve 25 can be determined to provide a solvent superficial velocity within the above-described broad and preferred ranges.

The phrase "solvent exchange rate" as utilized herein is a measure of the amount of solvent exposed to a given amount of beans in a specific time. For example, a rate of 1 pound of solvent/one pound of coffee beans/hour would mean that each pound of coffee beans contained in extractor 11 would be exposed to a total amount of one pound of solvent/every hour. When utilizing a solvent velocity of .09 ft./minute and a solvent exchange rate of 1 pound of solvent/pound of coffee beans/hour, the caffeine extracting time is about 23 hours, again assuming the use of methylene chloride solvent, an extracting temperature of 105° F., and a pre-wet moisture of 37%.

In the following comparative tests which are described herein to show the surprising effect of applicants' improvements, i.e., increased solvent velocity and increased exchange rates on caffeine extracting time. Only the solvent velocity and exchange rates were varied as indicated. Each of the other conditions utilized during the decaffeination processes conducted remained constant and were as follows:

Steaming:
    Temperature, 235° F.
    Time, 0.5 hour
    Moisture content, 17%
Pre-wetting: Total moisture content, 37%
Extracting (Methylene chloride solvent):
    Temperature, 105° F.
    Solvent velocity, .09 ft./minute
    Solvent exchange rate—1 pound/pound of coffee/hour
Solvent stripping:
    Temperature, 210° F.–220° F.
    Time, 1.5 hours
Drying and cooling:
    Drying in a roaster at 250° F.
    Cooling—ambient conditions The apparatus shown in the drawing was used to make each of the runs.

Utilizing applicants' increased solvent velocity rates alone and not in combination with increased exchange rates has been found to decrease a typical caffeine extracting time from 23 hours using a solvent velocity of .09 ft./minute which is not within applicant's range, to 20.5 hours utilizing a solvent velocity of .2 ft./minute which is within applicants' preferred range. Thus, the total reduction is caffeine extracting time is about 10.9%.

The solvent exchange rates utilized in this invention to provide substantial decreases in total decaffeination process times, are within the range of 2 pounds of solvent/pound of coffee/hour, to 12 pounds of solvent/pound of coffee/hour, and preferably within the range of 4 pounds of solvent/pound of coffee/hour, to 8 pounds of solvent/pound of coffee/hour. If rates slower than 2 pounds solvent/pound of coffee/hour are utilized, little effect upon total decaffeination process time is noted; on the other hand, if rates faster than 12 pounds solvent/pound of coffee/hour are employed, no further significant decrease in caffeine extracting times are seen.

As an example of the substantial caffeine extracting time reduction achieved, using a solvent velocity of .09 ft./minute and a solvent exchange rate of 1 pound/pound of coffee/hour provides a caffeine extracting time of 23 hours; however, increasing the solvent exchange rate to 6 pounds/pound of coffee/hour decreases the caffeine extracting time to 16 hours. Thus, the total decrease in extracting time for this specific example is 30.4%. In this comparative run, as well as the previous one, decaffeination was continued until the beans were 97% caffeine-free. 97% caffeine-free is an industry wide accepted minimum standard for decaffeination.

In comparison with using a solvent velocity of .09 ft./minute and a solvent exchange rate of 1 pound/pound of coffee/hour which provides a caffeine extracting process time of 23 hours, using the combination of applicants' factors, i.e. a solvent velocity of .2 ft./minute coupled with a solvent exchange rate of 6 pounds/pound of coffee/hour, provides a caffeine extracting time of only 12 hours, which is a total decrease in caffeine extracting time of 47.8%. Thus, the synergistic coaction between the two conditions, i.e. solvent velocity and exchange rate, can readily be seen from the above comparison. Utilizing applicants' solvent velocity alone provides a percent decrease in caffeine extraction time of 10.9%, and utilizing applicants' solvent exchange rate alone (both at the above specified rates), provides a percent decrease in caffeine extracting time of 30.4% whereas utilizing both applicants' solvent velocity and solvent exchange rate provides a decrease in caffeine extracting time of 47.8% which is greater than the additive effect expected by using both of applicants' conditions.

A further unexpected result besides a substantial decrease in caffeine extracting time is an unexpected slight but noticeable improvement in flavor when utilizing applicants' solvent velocity and solvent exchange rate. In particular, those flavor notes characteristically strong in "body" are slightly increased and the high grown flavor, usually characteristic of prime quality coffees, is noted to slightly increase. In isolating the effect of each of applicants' rates upon flavor, it has been noted that solvent exchange rate increases the body characteristic flavor notes while increase in solvent velocity provides an increase in high grown flavor and an increase in the characteristic body notes of the product.

The above description has been given with specific reference to the flow chart shown in the drawing; however, it is to be understood that other processes different from the batch process disclosed in the drawing can be utilized along with applicants' invention. In summary, the process need not be a batch process and can be semi-continuous such as a countercurrent process. For a detailed description of a countercurrent decaffeination process, see co-pending commonly assigned and concurrently filed herewith case, Patel et al., Ser. No. 118,184 entiled Semi-Continuous Countercurrent Decaffeination Process.

Example 250 pounds of green coffee beans (dry weight is 225 lbs.) comprising a blend consisting of Arabicas and Robustas is charged into extractor 11 through an inlet opening, not depicted on the drawing. Steam at a temperature of 230° F. is introduced into the system through steam line 12, passes through open valve 13; through separator 14 wherein condensate is trapped. The dry steam is passed therethrough and continues through open valve 15 and into the bottom of extractor 11. Steam is continually passed in an upwards manner through the green coffee beans contained in extractor 11 for 0.5 hour. After passing through the green coffee beans, the steam passes out of extractor 11 through open valve 17 and into line 18 leading to condenser 19, wherein the steam is condensed and the condensate passes through open valve 20 and is collected in separator 21. During the steaming operation valve 16 remains partially open so that condensate forming on the green beans can be removed through valve 16. The total moisture content of the green beans after steaming at 230 F. for 0.5 hour is 17%. This completes the steaming step.

Turning now to the pre-wetting step, wherein the moisture content of the beans is adjusted to 37%. It was calculated that the required amount of water necessary to provide a total bean moisture content of 37% was 86 pounds.

The required pre-wetting water and methylene chloride solvent are added simultaneously in the following manner. Fresh methylene chloride solvent from fresh solvent tank 27 drains into line 28 through open valve 29 and is pumped by centrifugal pump 30 through open valve 31 on line 32 and into line 24, and because valve 25 is closed and valve 33 open, the fresh solvent passes through valve 33 and line 33a into the bottom of extractor 11. Simultaneously with the solvent addition just described, the pre-wetting water is added through separator 21, pump 21a into line 23 through open valve 22 on line 23, and in the same manner as the solvent through open valve 33 and line 33a into the bottom of extractor 11. Part of the pre-wetting water will consist of the condensate from the steaming step which has collected in the separator 21. The balance of the pre-wetting water is fresh water which is added through the separator for convenience. During this solvent and water addition, valve 17 on line 18 remains open in order to vent steam pressure which builds up. The solvent and pre-wetting water are added at ambient conditions. The flow rate of fresh solvent and pre-wetting water into extractor 11 is 2.5 gallons/minute. The total amount of solvent used in filling extractor 11 is 1000 pounds. The ratio of solvent to beans is 4:1. This completes the pre-wetting step.

The methylene chloride solvent contained in extractor 11 is heated by continuously circulating through heat exchanger 37 (wherein it is adjusted to a temperature of 105° F.) and through extractor 11. Circulation is accomplished by opening valve 34 and allowing methylene chloride solvent contained in extractor 11 to drain into centrifugal pump 25a wherein it is pumped at a rate of 8.5 gallons/minute into line 24, through open valve 35 and into heat exchanger 37 wherein the methylene chloride is heated to a temperature of 105° F. Thereafter the methylene chloride solvent passes through open valve 36 and into line 38 and back into the top of extractor 11. Circulatory pumping of extracting solvent through heat exchanger 37 and into the top of extractor 11 and out of the bottom of extractor 11 and back into heat exchanger 37 is continued for 40 minutes until the solvent and bean temparatures are both 105° F. After completing this initial heating step, fresh solvent is continuously circulated into extractor 11 and spent solvent is continuously bled off from extractor 11 at an exchange rate of 6 pounds of solvent/pound of coffee/hour. Simultaneously, a small recirculation of spent solvent through line 24 and back into the top of extractor 11 is conducted such that the solvent superficial velocity is 0.20 feet/minute.

With reference to the drawing, the solvent exchange rate and the solvent velocity are controlled in the following manner: Fresh solvent from tank 27 passes into line 28 through open valve 29 and is pumped by pump 30 at a rate of 2.25 gallons/minute into line 32 and because valve 31 is closed, passes into line 40 through open valve 39 and into heat exchanger 37 wherein the temperature is adjusted to 105° F., the required extracting temperature. Thereafter the solvent passes into line 38 through open valve 36 and back into the top of extractor 11. Simultaneously with the fresh input of methylene chloride solvent through line 38, spent solvent is removed from the bottom of extractor 11 through open valve 34 at a rate of 8.5 gallons/minute and passes through pump 25a into line 24. Valve 25 on line 24 is partially closed, and therefore 25.5% of the spent solvent passes into line 41 through open valve 42 and into heat exchanger 43 wherein it is cooled and passes on into line 44a through open valve 44, and into spent solvent storage tank 45. In tank 45 the spent solvent is distilled at a 105° F. temperature into line 46a and passes through condenser 46 and back into fresh solvent tank 27. A majority portion (74.5%) of spent solvent passes through valve 25a on line 24 and is recirculated back into the top of extractor 11 at a solvent velocity of 0.20 feet/minute. After extracting for 12 hours at a temperature of 105° F. the extracting step is completed and the beans are found by quantitative analysis to be 97% caffeine-free.

Thereafter, solvent stripping is conducted at temperatures within the range of 220° F.–230° F. for a time of 1.5 hours in the exact manner previously described in connection with the steaming step.

Thereafter, the beans are discharged from extractor 11 through a discharge line, not depicted in the drawing, and subsequently vacuum dried at a temperature of 150° F. for a period of time of 3.5 hours. The vacuum drying pressure is 20 inches of mercury. Subsequently the beans are cooled by exposure to ambient condition air currents and utilized to prepare a roast and ground decaffeinated coffee product in the following manner. The total 250 pounds of decaffeinated blended green coffee beans are roasted in a Jubilee roaster at an air temperature maintained within the range of 400° F. to 440° F. The end roast temperature was 440° F. and the total roast time was 12 minutes. The roasted beans are quenched with 5 gallons of water.

Thereafter the blended roasted decaffeinated coffee beans were ground to regular grind size in a Gump grinder.

A panel of four expert tasters prepares cups of coffee from the roast and ground decaffeinated product by placing 7.2 grams per cup of desired beverage along with 178 ml. of water per cup of desired beverage in a conventional percolator, and allowing it to perk until the temperature reached 180° F., at which time the coffee beverage is poured into cups to be tasted by the expert panel.

In comparing the decaffeinated product of this invention with the decaffeinated product previously described in the specification with respect to the comparison test, it is noted that the panel characterized the flavor of the product utilizing applicants' solvent velocity rates and applicants' solvent exchange rate as more rich in characteristic body note and slightly increased in high grown flavor.

What is claimed is:

1. In a decaffeinating process, wherein said process involves the steps of steaming green coffee beans, pre-wetting the previously steamed green coffee beans, extracting the previously steamed and pre-wet green coffee beans, solvent stripping residual solvent away from said beans, and drying and cooling the beans to provide decaffeinated green coffee beans, the improvement comprising utilizing a solvent superficial velocity past said beans of from .15 foot/minute to 1 foot/minute.

2. The process of claim 1 wherein the solvent superficial velocity is .18 foot/minute to .25 foot/minute.

3. In a decaffeinating process, wherein said process involves the steps of steaming green coffee beans, pre-wetting the previously steamed green coffee beans, extracting the previously steamed and pre-wet green coffee beans, solvent stripping residual solvent way from said beans, and drying and cooling the beans to provide decaffeinated green coffee beans, the improvement comprising utilizing a solvent exchange rate of from 2 pounds of solvent/pound of coffee/hour to 12 pounds of solvent/pound of coffee/hour.

4. The process of claim 3 wherein the solvent exchange rate is from 4 pounds of solvent/pound of coffee/hour to 8 pounds of solvent/pound of coffee/hour.

5. In a decaffeination process involving the steps of steaming green coffee beans, pre-wetting the previously steamed green coffee beans, extracting the previously steamed and pre-wet green coffee beans, solvent stripping residual solvent away from the green coffee beans, and drying and cooling the beans to provide decaffeinated green coffee beans, the improvement comprising utilizing a solvent superficial velocity past the green coffee beans, of from .15 foot/minute to 1 foot/minute, and utilizing a solvent exchange rate of from 2 pounds of solvent/pound of coffee/hour to 12 pounds of solvent/pound of coffee/hour.

6. The process of claim 5 wherein the solvent velocity is from .18 foot/minute to .25 foot/minute, and the solvent exchange rate is from 4 pounds of solvent/pound of coffee/hour to 8 pounds of solvent/pound of coffee/hour.

References Cited

UNITED STATES PATENTS

| | | | |
|---|---|---|---|
| 2,284,033 | 5/1942 | Berry | 99—69 |
| 2,309,092 | 1/1943 | Berry et al. | 99—70 |
| 1,977,416 | 10/1934 | Wilder | 99—70 |

OTHER REFERENCES

Sivetz, Coffee Processing Technology, vol. II, 1963, pp. 207.

FRANK W. LUTTER, Primary Examiner

W. L. MENTLIK, Assistant Examiner